(12) United States Patent
Attar et al.

(10) Patent No.: US 8,576,733 B2
(45) Date of Patent: Nov. 5, 2013

(54) CONTROL OF ACCESS TERMINAL OPERATION BASED ON INTERFERENCE INFORMATION

(75) Inventors: Rashid Ahmed Akbar Attar, San Diego, CA (US); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 324 days.

(21) Appl. No.: 12/547,923

(22) Filed: Aug. 26, 2009

(65) Prior Publication Data

US 2010/0056153 A1 Mar. 4, 2010

Related U.S. Application Data

(60) Provisional application No. 61/092,203, filed on Aug. 27, 2008.

(51) Int. Cl.
*H04W 48/12* (2009.01)

(52) U.S. Cl.
USPC .......................................... 370/252; 370/331

(58) Field of Classification Search
USPC ................................................. 370/252, 331
See application file for complete search history.

(56) References Cited

U.S. PATENT DOCUMENTS

| 6,028,851 | A | 2/2000 | Persson et al. |
|---|---|---|---|
| 7,197,692 | B2 | 3/2007 | Sutivong et al. |
| 7,536,626 | B2 | 5/2009 | Sutivong et al. |
| 2006/0276191 | A1 | 12/2006 | Hwang et al. |
| 2007/0041429 | A1* | 2/2007 | Khandekar ................... 375/146 |
| 2009/0111503 | A1* | 4/2009 | Pedersen et al. .............. 455/522 |
| 2010/0075689 | A1 | 3/2010 | Uemura et al. |
| 2010/0203917 | A1* | 8/2010 | Yang et al. .................... 455/522 |

FOREIGN PATENT DOCUMENTS

| CN | 1271504 A | 10/2000 |
|---|---|---|
| EP | 1876854 A1 | 1/2008 |
| EP | 1876854 A1 | 1/2008 |
| JP | 2001518770 A | 10/2001 |
| JP | 2008160380 A | 7/2008 |
| WO | 9917582 A1 | 4/1999 |
| WO | 9959368 A1 | 11/1999 |

(Continued)

OTHER PUBLICATIONS

Motorola, 'Uplink Power Control: Details', 3GPP TSG RAN1 #49-bis, R1-072675, (Jun. 25-29, 2007) pp. 1-3.*

(Continued)

*Primary Examiner* — Melvin Marcelo
(74) *Attorney, Agent, or Firm* — Anthony R. Morris

(57) ABSTRACT

Systems and methodologies are described that facilitate distributing and utilizing interference information in a wireless communication environment. Interference information can be generated by a base station by evaluating uplink conditions, and disparate interference information can be collected from neighbor base station(s). Interference information associated with the base station and the neighbor base station(s) can be transmitted by the base station to access terminal(s). An access terminal that receives that interference information associated with the base station and the neighbor base station(s) can control an operation based at least in part upon the interference information. For example, the access terminal can adjust a transmit power, select a target serving base station for handover, and/or choose a random access channel (RACH) resource to use for random access as a function of the interference information associated with the base station and the neighbor base station(s).

20 Claims, 12 Drawing Sheets

(56) References Cited

FOREIGN PATENT DOCUMENTS

| WO | WO9959368 A1 | 11/1999 |
| WO | 2008004811 A1 | 1/2008 |
| WO | 2008093621 A1 | 8/2008 |

OTHER PUBLICATIONS

Lucent Technologies, 'Uplink Scheduling With Inter-Cell Power Control, with Extensions to Interference Coordination', 3GPP TSG-RAN WG1 #47, R1-063478, (Nov. 6-10, 2006) pp. 1-7.*
U.S. Appl. No. 61/001,164, filed Oct. 31, 2007.*
3GPP TSG RAN1 #50-bis, R1-074042, 'Uplink Inter-Cell Power Control: X2 Messages', Motorola, Oct. 8-12, 2007, p. 1.*
International Search Report and Written Opinion—PCT/US2009/055210—ISA/EPO—Dec. 29, 2009.
Ji-Ren Y. et al., "A True Single-Phase-Clock Dynamic CMOS Circuit Technique," Solid-State Circuits, IEEE Journal of, vol. 22, No. 5, pp. 899-901, Oct. 1987 DOI: 10.1109/JSSC.1987.1052831.
Qualcomm Europe, "Details on specification aspects for UL ICIC", R1-081973, 3GPP TSG-RAN WG1 #53 (May 14, 2008).
R1-071634, "Investigations on Inter-cell Transmission Power Control based on Overload Indicator in E-UTRA Uplink," NTT DoCoMo, Mar. 26-30, 2007.
Taiwan Search Report—TW098128885—TIPO—Sep. 27, 2012.

* cited by examiner

CONTROL OF ACCESS TERMINAL OPERATION BASED ON INTERFERENCE INFORMATION

CROSS-REFERENCE TO RELATED APPLICATIONS

This application claims the benefit of U.S. Provisional Patent Application Ser. No. 61/092,203 entitled "METHOD AND APPARATUS FOR CONTROLLING OPERATION OF A USER EQUIPMENT (UE) BASED ON INTERFERENCE INFORMATION" which was filed Aug. 27, 2008. The entirety of the aforementioned application is herein incorporated by reference.

BACKGROUND

I. Field

The following description relates generally to wireless communications, and more particularly to controlling operation of an access terminal utilizing interference information in a wireless communication system.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, . . . ). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple access terminals. Each access terminal can communicate with one or more base stations via transmissions on forward and reverse links. The forward link (or downlink) refers to the communication link from base stations to access terminals, and the reverse link (or uplink) refers to the communication link from access terminals to base stations. This communication link can be established via a single-in-single-out, multiple-in-single-out or a multiple-in-multiple-out (MIMO) system.

MIMO systems commonly employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which can be referred to as spatial channels, where $N_S \leq \{N_T, N_R\}$. Each of the $N_S$ independent channels corresponds to a dimension. Moreover, MIMO systems can provide improved performance (e.g., increased spectral efficiency, higher throughput and/or greater reliability) if the additional dimensionalities created by the multiple transmit and receive antennas are utilized.

MIMO systems can support various duplexing techniques to divide forward and reverse link communications over a common physical medium. For instance, frequency division duplex (FDD) systems can utilize disparate frequency regions for forward and reverse link communications. Further, in time division duplex (TDD) systems, forward and reverse link communications can employ a common frequency region so that the reciprocity principle allows estimation of the forward link channel from reverse link channel.

Wireless communication systems oftentimes employ one or more base stations that provide a coverage area. A typical base station can transmit multiple data streams for broadcast, multicast and/or unicast services, wherein a data stream may be a stream of data that can be of independent reception interest to an access terminal. An access terminal within the coverage area of such base station can be employed to receive one, more than one, or all the data streams carried by the composite stream. Likewise, an access terminal can transmit data to the base station or another access terminal.

Conventionally, in a wireless communication system, multiple access terminals simultaneously send transmissions (e.g., data, control information, . . . ) over the uplink to respective serving base stations. Transmissions from each access terminal can cause interference to non-serving base stations located within proximity. To address the foregoing, common techniques oftentimes employ significant downlink bandwidth to carry commands to control transmit power of the access terminals. Moreover, heightened base station implementation complexity is oftentimes encountered in connection with such conventional approaches for centrally controlling transmit power of access terminals.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating distribution and utilization of interference information in a wireless communication environment. Interference information can be generated by a base station by evaluating uplink conditions, and disparate interference information can be collected from neighbor base station(s). Interference information associated with the base station and the neighbor base station(s) can be transmitted by the base station to access terminal(s). An access terminal that receives that interference information associated with the base station and the neighbor base station(s) can control an operation based at least in part upon the interference information. For example, the access terminal can adjust a transmit power, select a target serving base station for handover, and/or choose a random access channel (RACH) resource to use for random access as a function of the interference information associated with the base station and the neighbor base station(s).

According to related aspects, a method that facilitates managing operation of an access terminal in a wireless communication environment is described herein. The method can include receiving interference information corresponding to a base station and at least one neighbor base station via a transmission from the base station at an access terminal. Moreover, the method can include controlling an operation of the access terminal based on the interference information corresponding to the base station and the at least one neighbor base station.

Another aspect relates to a wireless communications apparatus. The wireless communications apparatus can include a memory that retains instructions related to obtaining interference information corresponding to a base station and at least one neighbor base station via a transmission from the base station, and controlling an operation of an access terminal based on the interference information corresponding to the base station and the at least one neighbor base station. Further, the wireless communications apparatus can include a processor, coupled to the memory, configured to execute the instructions retained in the memory.

Yet another aspect relates to a wireless communications apparatus that enables utilizing interference information in a wireless communication environment. The wireless communications apparatus can include means for obtaining interference information pertaining to a base station and one or more neighbor base stations via a transmission from the base station. Moreover, the wireless communications apparatus can include means for managing an operation of an access terminal as a function of the interference information pertaining to the base station and the one or more neighbor base stations.

Still another aspect relates to a computer program product that can comprise a computer-readable medium. The computer-readable medium can include code for obtaining interference information pertaining to a base station and one or more neighbor base stations via a transmission from the base station. Moreover, the computer-readable medium can include code for controlling at least one of alteration of a transmit power of an access terminal, selection of a target serving base station for handover, or selection of a random access channel (RACH) resource to use for random access as a function of the interference information pertaining to the base station and the one or more neighbor base stations.

In accordance with another aspect, a wireless communications apparatus can include a processor, wherein the processor can be configured to receive interference information pertaining to a base station and one or more neighbor base stations via a transmission from the base station. The processor can further be configured to manage at least one of adjustment of a transmit power of an access terminal, selection of a target serving base station for handover, or selection of a random access channel (RACH) resource to use for random access as a function of the interference information pertaining to the base station and the one or more neighbor base stations.

According to other aspects, a method that facilitates disseminating interference information in a wireless communication environment is described herein. The method can include monitoring uplink conditions at a base station to generate interference information. Moreover, the method can include collecting disparate interference information from at least one neighbor base station. Further, the method can include transmitting the generated interference information and the disparate interference information to one or more access terminals from the base station.

Another aspect relates to a wireless communications apparatus. The wireless communications apparatus can include a memory that retains instructions related to measuring uplink parameters at a base station to yield interference information, collecting disparate interference information yielded by at least one neighbor base station, and sending the yielded interference information and the disparate interference information to at least one access terminal from the base station. Further, the wireless communications apparatus can include a processor, coupled to the memory, configured to execute the instructions retained in the memory.

Yet another aspect relates to a wireless communications apparatus that enables distributing interference information in a wireless communication environment. The wireless communications apparatus can include means for analyzing uplink conditions to yield interference information. Moreover, the wireless communications apparatus can include means for assembling interference information from one or more neighbor base stations. Further, the wireless communications apparatus can include means for sending the yielded interference information and the assembled interference information to one or more access terminals.

Still another aspect relates to a computer program product that can comprise a computer-readable medium. The computer-readable medium can include code for analyzing uplink conditions to yield interference information. The computer-readable medium can further include code for collecting interference information from one or more neighbor base stations. Moreover, the computer-readable medium can include code for transferring the yielded interference information and the collected interference information to one or more access terminals.

In accordance with another aspect, a wireless communications apparatus can include a processor, wherein the processor can be configured to evaluate uplink conditions to generate interference information. Moreover, the processor can be configured to collect interference information from one or more neighbor base stations. Further, the processor can be configured to transmit the generated interference information and the collected interference information to one or more access terminals via one or more of a broadcast channel, a control channel, or a loading information channel.

Toward the accomplishment of the foregoing and related ends, the one or more embodiments comprise the features hereinafter fully described and particularly pointed out in the claims. The following description and the annexed drawings set forth herein detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
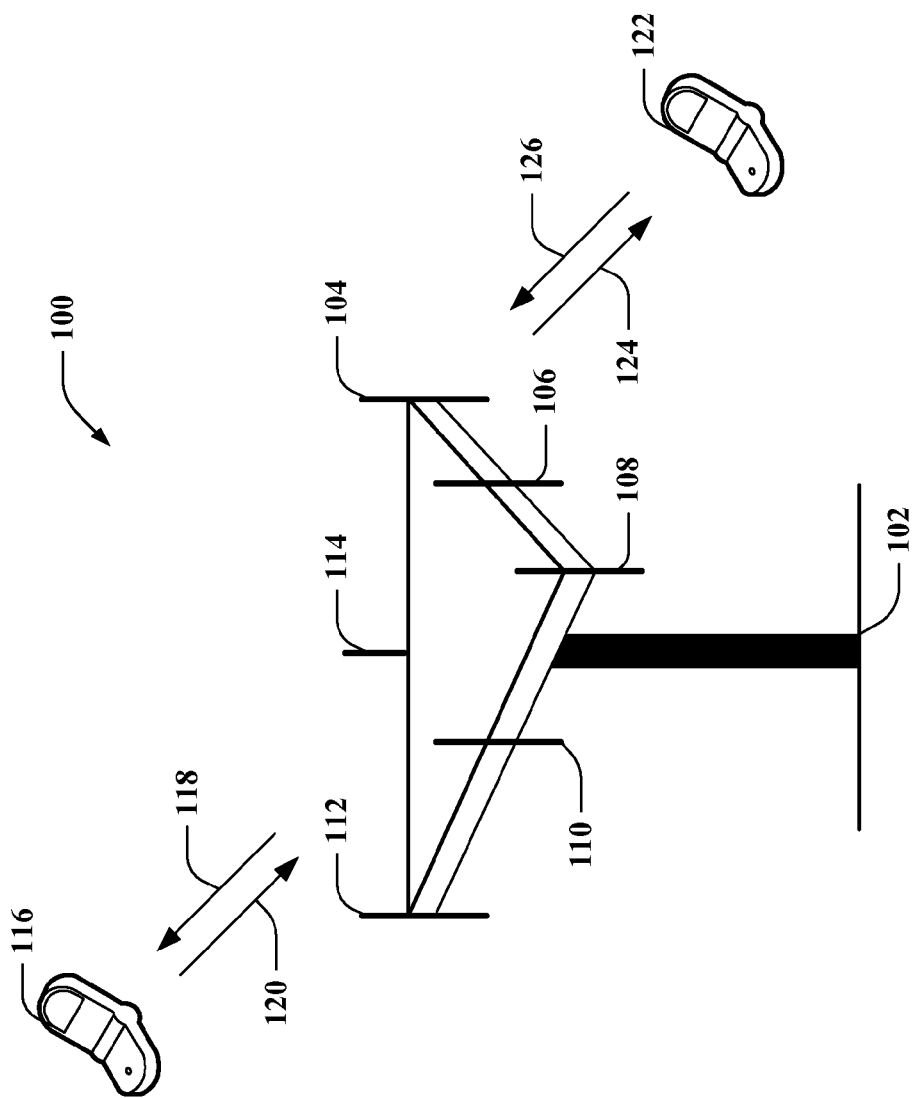
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

Furthermore, various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, Evolved Node B (eNodeB, eNB) or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more access terminals such as access terminal 116 and access terminal 122; however, it is to be appreciated that base station 102 can communicate with substantially any number of access terminals similar to access terminals 116 and 122. Access terminals 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, access terminal 116 is in communication with antennas 112 and 114, where antennas 112 and 114 transmit information to access terminal 116 over a forward link 118 and receive information from access terminal 116 over a reverse link 120. Moreover, access terminal 122 is in communication with antennas 104 and 106, where antennas 104 and 106 transmit information to access terminal 122 over a forward link 124 and receive information from access terminal 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to access terminals in a sector of the areas covered by base station 102. In communication over forward links 118 and 124, the transmitting antennas of base station 102 can utilize beamforming to improve signal-to-noise ratio of forward links 118 and 124 for access terminals 116 and 122. Also, while base station 102 utilizes beamforming to transmit to access terminals 116 and 122 scattered randomly through an associated coverage, access terminals in neighboring cells can be subject to less interference as compared to a base station transmitting through a single antenna to all its access terminals.

System 100 supports sending interference information indicative of observed interference over the downlink to access terminals 116, 122. The interference information can be interference-over-thermal (IoT) information, loading information, or the like. Base station 102 can measure conditions (e.g., associated with the uplink, . . . ) to generate interference information. Additionally or alternatively, interference information corresponding to base station 102 can be preset. Moreover, base station 102 can collect interference information from one or more neighboring base stations (not shown) (e.g., the one or more neighboring base stations can similarly measure conditions to generate respective interference information related thereto and/or can be associated with predefined, respective interference information, . . . ). Base station 102 can thereafter convey the measured and/or preset interference information corresponding to base station 102 and interference information collected from neighboring base station(s) to access terminals 116, 122.

Further, an access terminal (e.g., access terminal 116, access terminal 122, . . . ) can utilize received interference information observed by base station 102 and neighboring base station(s) to control operation thereof. For example, the access terminal can adjust its transmit power based at least in part upon the obtained interference information. According to another example, the access terminal can enhance a success rate associated with random access by utilizing random access channel (RACH) resource(s) selected as a function of the received interference information. Pursuant to a further example, improved forward handover decisions can be provided by the access terminal selecting a desired serving base station (e.g., as part of forward handover, . . . ) based upon the received interference information.

Figure 2:
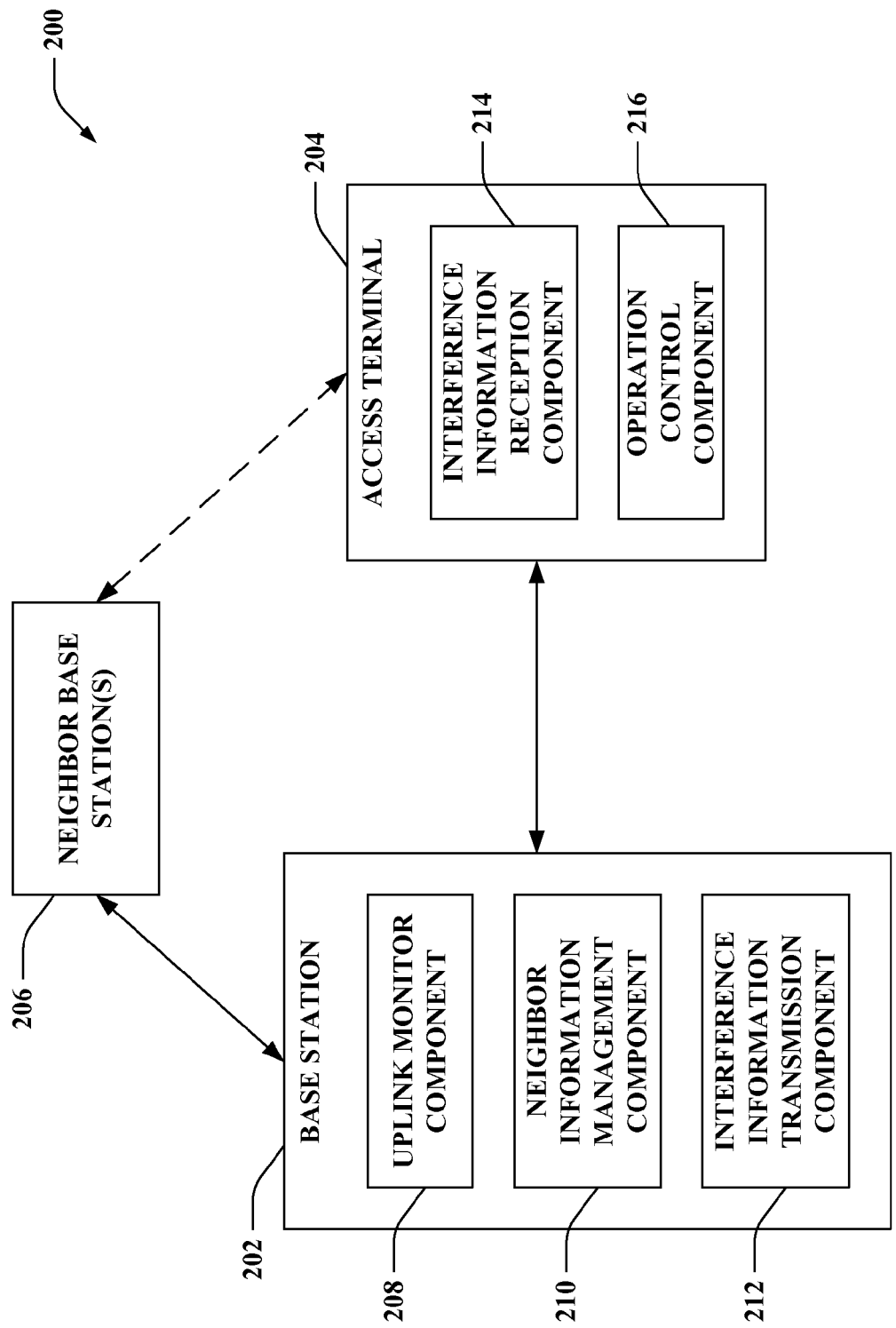
FIG. 2 is an illustration of an example system that disseminates and utilizes uplink interference information in a wireless communication environment.

Now referring to FIG. 2, illustrated is a system 200 that disseminates and utilizes uplink interference information in a wireless communication environment. System 200 includes a base station 202 that can transmit and/or receive information, signals, data, instructions, commands, bits, symbols, and the like. Base station 202 can communicate with an access terminal 204 via the forward link and/or reverse link. Access terminal 204 can transmit and/or receive information, signals, data, instructions, commands, bits, symbols, and the like. System 200 can further include one or more neighbor base station(s) 206, each of which can be substantially similar to base station 202. Moreover, although not shown, it is contemplated that any number of access terminals similar to access terminal 204 can be included in system 200. According to an illustration, system 200 can be a Long Term Evolution (LTE) based system; however, the claimed subject matter is not so limited.

Base station 202 can include an uplink monitor component 208 that can measure conditions associated with an uplink to yield interference information. According to an illustration, uplink monitor component 208 can detect interference-over-thermal (IoT) information related to the uplink. For instance, the IoT information can include an IoT value per subband. Additionally or alternatively, at least a portion of the interference information associated with base station 202 can be preset (e.g., the IoT information can include predefined information, . . . ). Thus, according to an example, base station 202 can be associated with a given IoT threshold.

IoT is a ratio between total received interference power and a thermal noise power. Pursuant to an example, uplink monitor component 208 can separately measure a thermal noise level and a total interference level (e.g., which includes both thermal noise and interference from other transmitters, . . . ) per subband. For instance, separate measurement of the thermal noise level can be effectuated when a transmission waveform includes periods (e.g., in time and frequency, . . . ) during which there is no transmission from any transmitter. Such periods can be used by uplink monitor component 208 to measure the thermal level.

Moreover, it is to be appreciated that neighbor base station(s) 206 can each similarly analyze uplink conditions to generate respective interference information (e.g., each leveraging a respective uplink monitor component that can be substantially similar to uplink monitor component 208 of base station 202, . . . ). Further, neighbor base station(s) 206 can also be associated with respective, predefined interference information.

Base station 202 can additionally include a neighbor information management component 210 that can collect interference information from neighbor base station(s) 206. Neighbor information management component 210 can obtain, from each neighbor base station 206, respective measured and/or preset interference information. By way of example, neighbor information management component 210 can obtain respective IoT information from neighbor base station(s) 206. Following this example, the IoT information received by neighbor information management component 210 from a particular one of neighbor base station(s) 206 can include at least one IoT value for at least one subband and/or at least one IoT threshold.

Moreover, neighbor information management component 210 can further distribute interference information associated with base station 202 to neighbor base station(s) 206. Thus, for example, neighbor information management component 210 can send measured interference information collected by uplink monitor component 208 to neighbor base station(s) 206. Additionally or alternatively, neighbor information management component 210 can transfer preset interference information associated with base station 202 to neighbor base station(s) 206.

Base station 202 can further include an interference information transmission component 212 that can transmit the interference information associated with base station 202 and neighbor base station(s) 206 to access terminal 204 (and/or any disparate access terminal(s) (not shown)). Thus, interference information transmission component 212 can send interference information associated with base station 202 (e.g., predefined, yielded by uplink monitor component 208, . . . ) and interference information collected from neighbor base station(s) 206 via neighbor information management component 210. Interference information transmission component 212 can transfer the interference information via a broadcast channel such as a Dynamic Broadcast Channel (D-BCH), a control channel such as a Physical Downlink Control Channel (PDCCH) targeted to access terminals (e.g., access terminal 204, disparate access terminal(s) (not shown), . . . ) within proximity of base station 202, a loading information channel (LICH), a combination thereof, or the like. The interference information can be sent by interference information transmission component 212 at a suitable rate, which can be dependent on available resources or system bandwidth for sending the interference information.

Access terminal 204 can include an interference information reception component 214 and an operation control component 216. Interference information reception component 214 can receive the interference information related to base station 202 and neighbor base station(s) 206. Such interference information can be received by interference information reception component 214 from base station 202. Interference information reception component 214 can obtain the interference information from base station 202 via a broadcast channel, a control channel, a loading information channel, a combination thereof, or the like.

According to an example, base station 202 can be a serving base station for access terminal 204. Following this example, interference information reception component 214 can receive interference information pertaining to its serving base station (e.g., base station 202, . . . ) and at least one base station within proximity of the serving base station (e.g., neighbor base station(s) 206, . . . ). Such interference information can be received by interference information reception component 214 via a transmission sent by the serving base station.

Further, operation control component 216 can utilize the received interference information (e.g., corresponding to base station 202 and neighbor base station(s) 206, . . . ) from base station 202 to manage one or more operations associated with access terminal 204. For instance, operation control component 216 can use the interference information for closed-loop power control (CLPC). According to another example, operation control component 216 can employ the interference information to perform random access. By way of a further example, operation control component 216 can utilize the interference information to effectuate handover decisions. Moreover, operation control component 216 can effectuate a combination of more than one of the above example operations based on the interference information. It is further contemplated that operation control component 216 can leverage the interference information to control other operations corresponding to access terminal 204, and the claimed subject matter is not limited to the foregoing examples.

An update rate used for communicating interference information (e.g., sent by interference information transmission component 212 of base station 202, obtained by interference information reception component 214 of access terminal 204, . . . ) can depend on available system bandwidth (BW) for the interference information. For instance, a faster update rate (e.g., ~5-10 ms, . . . ) can allow for fast transmit power adjustment at access terminal 204 effectuated by operation control component 216. Moreover, a slower update rate can allow for long term transmit power alteration, random access channel (RACH) selection, and/or handover decisions performed by access terminal 204 (e.g., by operation control component 216, . . . ).

Figure 3:
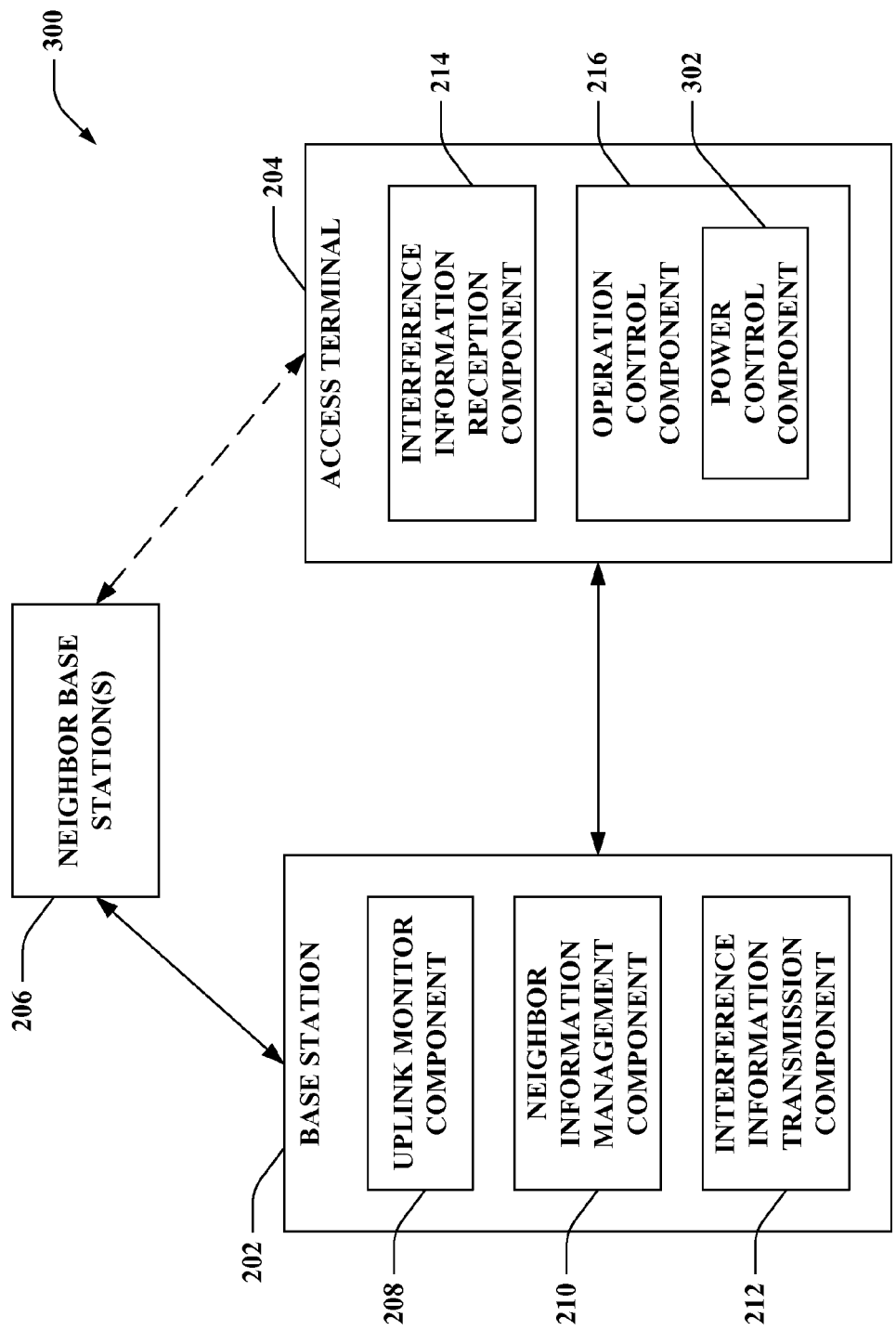
FIG. 3 is an illustration of an example system that enables access terminal adjustment of transmit power in a wireless communication environment.

Turning to FIG. 3, illustrated is a system 300 that enables access terminal adjustment of transmit power in a wireless communication environment. System 300 includes base station 202, access terminal 204, and neighbor base station(s) 206. Base station 202 can further include uplink monitor component 208 which measures and/or generates interference information associated with an uplink, neighbor information management component 210 which collects interference information from neighbor base station(s) 206, and interference information transmission component 212 which distributes the interference information pertaining to base station 202 and neighbor base station(s) 206. Moreover, access terminal 204 further includes interference information reception component 214 which obtains the interference information sent by base station 202 (e.g., interference information transmission component 212, . . . ) and operation control component 216. According to the depicted example, operation control component 216 can include a power control component 302 which manages a transmit power utilized by access terminal 204 based at least in part upon the interference information.

Power control component 302 can support access terminal based closed loop power control (CLPC) with distributed interference management. Power control component 302 can adjust a transmit power utilized by access terminal 204 using channel information (e.g., from the downlink (DL), . . . ) and interference information associated with the uplink. Each base station (e.g., base station 202, neighbor base station(s) 206, . . . ) can send interference information via a fast LICH or some other channel. Power control component 302 can use the interference information for each base station in a candidate switching set to adjust a transmit power for access terminal 204. For example, power control component 302 can adjust the transmit power based on a channel gain to a serving base station (e.g., base station 202, . . . ) and weighted channel gains to non-serving base station(s) (e.g., neighbor base station(s) 206, . . . ) with downlink energy per symbol (Es) above a threshold. The aforementioned example can be especially applicable when system 300 is a TDD system if channel reciprocity applies and the downlink and uplink transmit and receive configurations match.

Pursuant to another example, power control component 302 can adjust the transmit power employed by access terminal 204 based on weighted interference information (e.g., weighted LICH, weighted IoT value, . . . ) from base stations with Es above a threshold. The interference information can be weighted across subbands if access terminal 204 utilizes multiple subbands.

In general, power control component 302 can alter the transmit power used by access terminal 204 based on channel information and interference information. A faster update rate (e.g., approximately 5 to 10 ms, . . . ) for the interference information can allow for fast transmit power alteration by power control component 302. A slower update rate for the interference information can allow for long term transmit power adjustment by power control component 302. Moreover, in conjunction with the foregoing, base station 202 can select a modulation and coding scheme (MCS), assignment resources (e.g., resource blocks (RBs), . . . ), and/or schedule access terminal 204 based at least in part on the transmit power of access terminal 204.

Access terminal based closed loop power control provided by power control component 302 can yield various advantages. For instance, distributed processing (e.g., at access terminal 204, . . . ) can be provided with centralized control (e.g., at base station 202, . . . ). Hence, implementation complexity of base station 202 can be reduced. Further, downlink overhead associated with carrying uplink closed loop power control (CLPC) commands and uplink grants (where possible) can be reduced.

Figure 4:
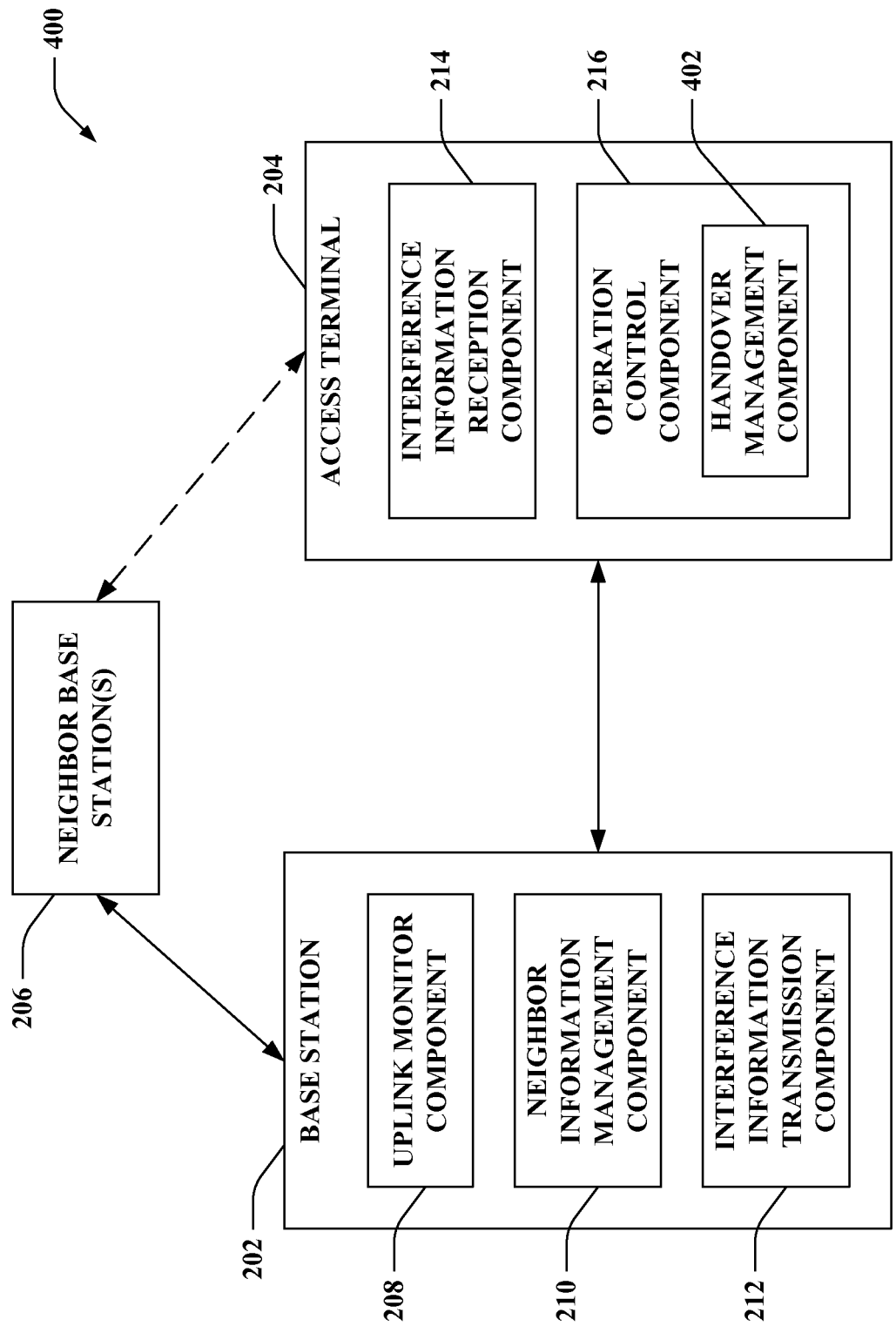
FIG. 4 is an illustration of an example system that effectuates forward handover decisions based on interference information in a wireless communication environment.

Referring to FIG. 4, illustrated is a system 400 that effectuates forward handover decisions based on interference information in a wireless communication environment. System 400 includes base station 202, access terminal 204, and neighbor base station(s) 206 as set forth herein. Base station 202 can further include uplink monitor component 208, neighbor information management component 210, and interference information transmission component 212. Moreover, access terminal 204 can include interference information reception component 214 and operation control component 216.

Operation control component 216 can further include a handover management component 402 that can select a base station (e.g., base station 202, one of neighbor base station(s) 206, . . . ) for handover based at least in part upon received interference information. For example, handover management component 402 can choose a base station for handover as a function of downlink energy per symbol (Es), uplink channel conditions and uplink loading. Access terminal 204 can measure the downlink energy per symbol based upon a pilot or reference signal transmitted over the downlink. Moreover, access terminal 204 can obtain a downlink channel estimate for a particular base station based on the pilot or reference signal. For a TDD system, access terminal 204 can obtain uplink channel information based on the downlink channel estimate by assuming channel reciprocity and calibrated transmit and receive configurations for the downlink and uplink. Further, access terminal 204 can receive interference information from the downlink serving base station (e.g., base station 202, . . . ); the interference information can be obtained by the interference information reception component 214. The interference information can be indicative of the uplink loading for the serving base station (e.g., base station 202, . . . ) as well as neighbor base station(s) 206.

Handover management component 402 can select a base station for handover as follows. Handover management component 402 can identify candidate base stations based on the uplink loading. For example, a base station can be considered as a candidate base station if it has X dB margin to uplink loading, where X can be a suitable value. Thus, handover management component 402 can yield a list of candidate base stations. The candidate base station list can be empty or can include one or more candidate base stations. Further, handover management component 402 can select a candidate base station from the candidate base station list with the best downlink energy per symbol (Es) if the candidate base station list is not empty (e.g., not a NULL set, . . . ). Moreover, handover management component 402 can choose a base station with the best downlink energy per symbol (Es) if the candidate base station list is empty (e.g., NULL set, . . . ). Handover management component 402 can thus select a base station for handover with access terminal 204 with a best downlink energy per symbol (Es) among the candidate base stations subject to the uplink channel and uplink loading of the candidate base stations. In contrast, conventional techniques typically involve selecting a base station for handover based on the downlink energy per symbol (Es) without considerations of the uplink channel conditions or uplink loading. Hence, availability of interference information obtained from base station 202 corresponding to base station 202 and neighbor base station(s) 206 can improve forward handover base station selection.

Figure 5:
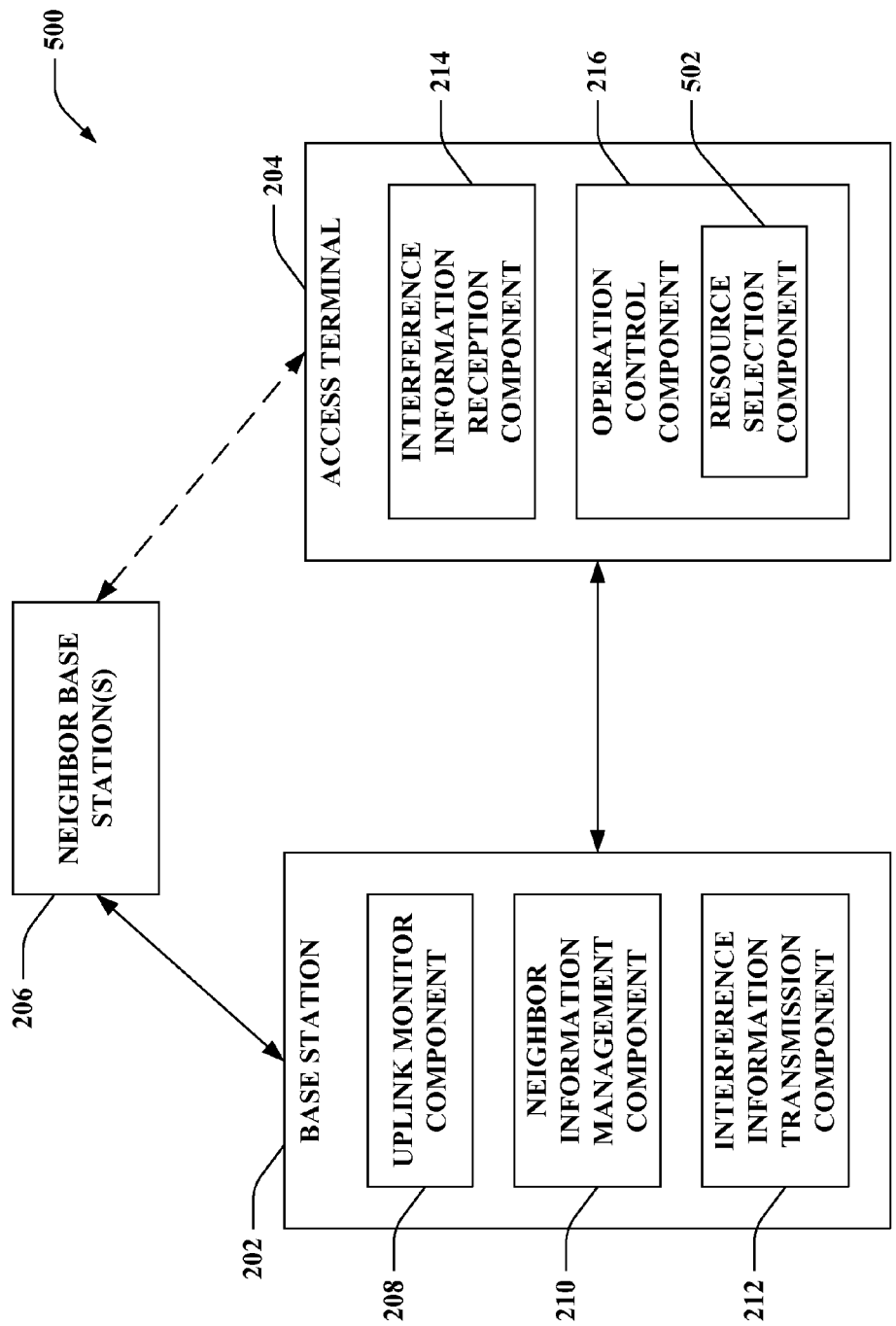
FIG. 5 is an illustration of an example system that performs random access based upon interference information related to a base station and neighbor base station(s) provided to an access terminal in a wireless communication environment.

Turning to FIG. 5, illustrated is a system 500 that performs random access based upon interference information related to a base station (e.g., base station 202, . . . ) and neighbor base station(s) (e.g., neighbor base station(s) 206, . . . ) provided to an access terminal (e.g., access terminal 204, . . . ) in a wireless communication environment. As set forth herein, base station 202 can include uplink monitor component 208, neighbor information management component 210, and interference information transmission component 212, and access terminal 204 can include interference information reception component 214 and operation control component 216.

Operation control component 216 can further include a resource selection component 502 that performs random access based on received interference information. Resource selection component 502 can select random access channel (RACH) resource(s) with an optimal uplink channel subject to uplink loading. If uplink loading per subband is available (e.g., interference information obtained by interference information reception component 214 from base station 202, . . . ), then resource selection component 502 can include RACH resources for subbands with X dB margin to uplink loading in a candidate RACH set. From the set of candidate RACH resources, resource selection component 502 can select a RACH resource in the subband with the best downlink energy per symbol (Es). It is contemplated, however, that resource selection component 502 can select RACH resource(s) based on interference information in other manner. Moreover, access terminal 204 can perform random access using the selected RACH resource.

RACH success probability can be improved by selecting RACH resources based on uplink channel and uplink loading information. In contrast, conventionally in Frequency Division Duplex (FDD) systems, an access terminal commonly selects a RACH resource for access channel transmission randomly or based on pre-configured assignment. Further, in TDD systems, an access terminal can obtain uplink channel information based on a downlink channel estimate due to channel reciprocity.

Figure 6:
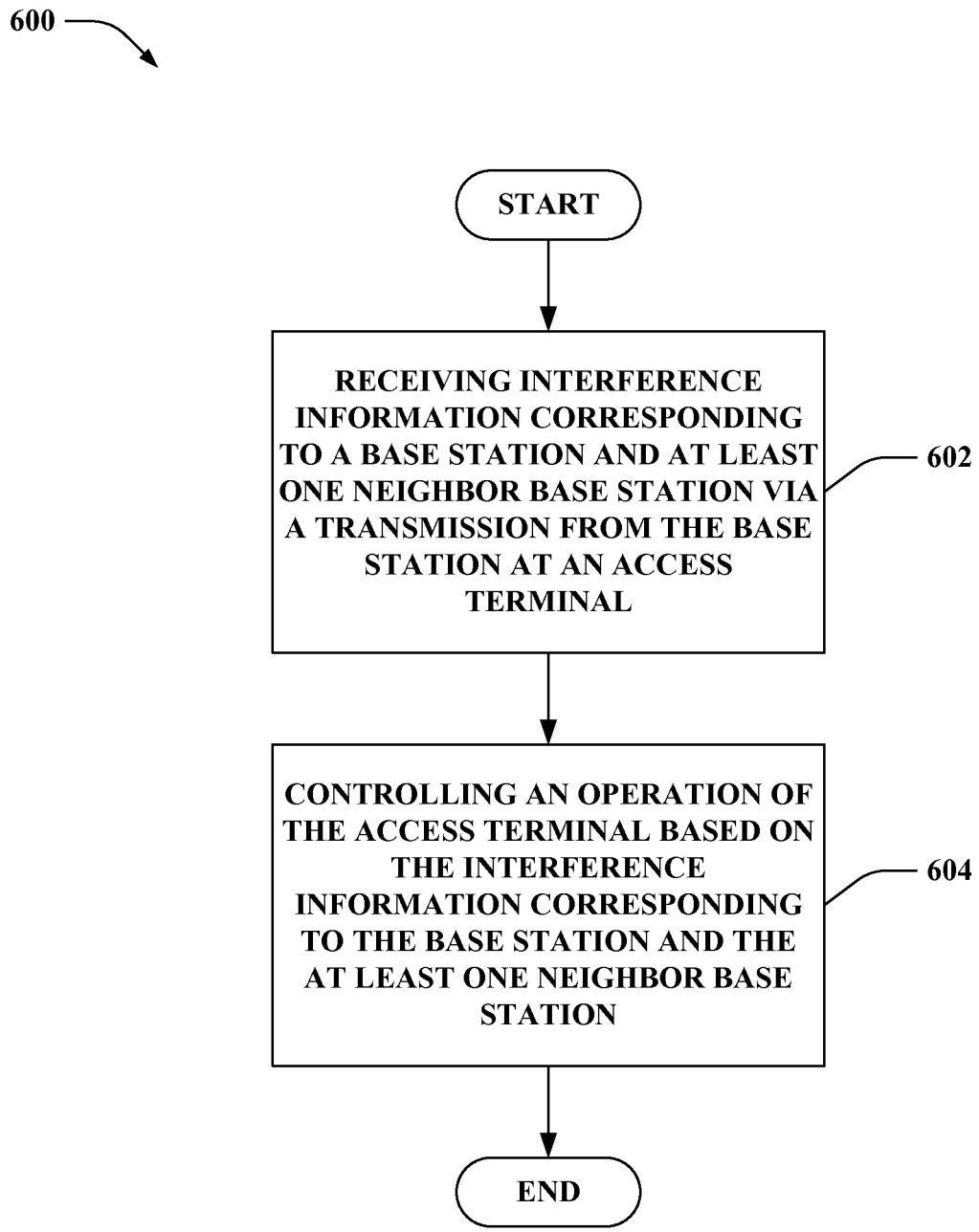
FIG. 6 is an illustration of an example methodology that facilitates managing operation of an access terminal in a wireless communication environment.
Figure 7:
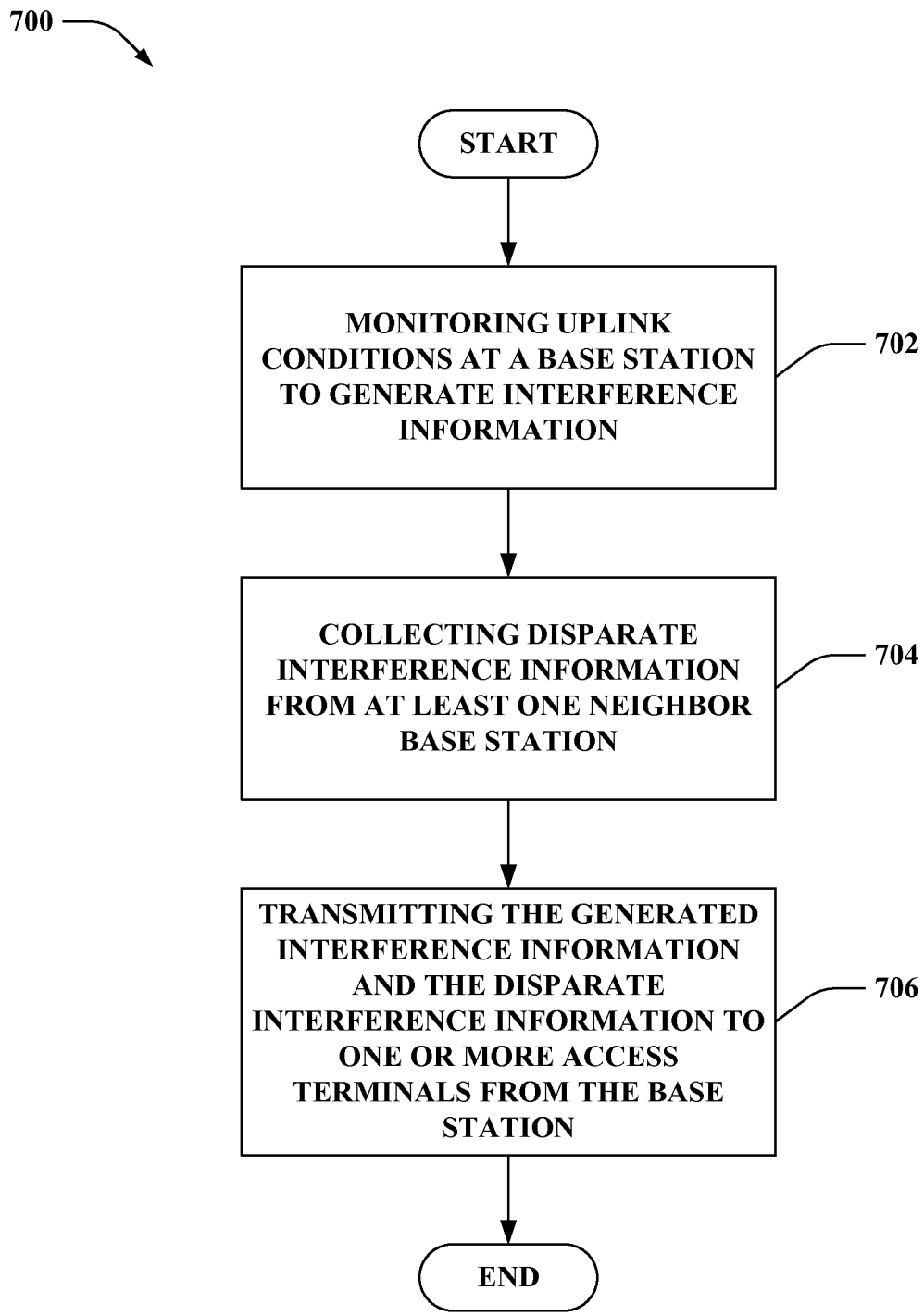
FIG. 7 is an illustration of an example methodology that facilitates disseminating interference information in a wireless communication environment.

Referring to FIGS. 6-7, methodologies relating to employing interference information received from a base station to control operation of an access terminal in a wireless communication environment are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

With reference to FIG. 6, illustrated is a methodology 600 that facilitates managing operation of an access terminal in a wireless communication environment. At 602, interference information corresponding to a base station and at least one neighbor base station can be received via a transmission from the base station at an access terminal. For instance, the transmission carrying the interference information can be sent via a broadcast channel such as a Dynamic Broadcast Channel (D-BCH), a control channel such as a Physical Downlink Control Channel (PDCCH), a loading information channel (LICH), a combination thereof, or the like. Further, the base station from which the interference information is received can be a serving base station for the access terminal.

The interference information can include measured interference information and/or preset interference information. For example, the interference information can include interference-over-thermal (IoT) information, loading information, or the like. Further, the IoT information can include at least one IoT value for at least one subband for each of the base station and the at least one neighbor base station. Additionally or alternatively, the IoT information can include an IoT threshold for each of the base station and the at least one neighbor base station.

At 604, an operation of the access terminal can be controlled based on the interference information corresponding to the base station and the at least one neighbor base station. For example, a transmit power of the access terminal can be adjusted based on the interference information corresponding to the base station and the at least one neighbor base station. The access terminal can adjust the transmit power as a function of channel gain to the base station (e.g., serving base station, . . . ) and weighted channel gains to the at least one neighbor base station (e.g., non-serving base station(s), . . . ) each with downlink energy per symbol (Es) above a threshold. The transmit power can be further adjusted based on weighted interference information from the base station and the at least one neighbor base station with respective energy per symbol above a threshold.

Pursuant to another example, a target serving base station can be selected for handover from the at least one neighbor base station as a function of the interference information corresponding to the base station and the at least one neighbor base station. The target serving base station can be selected for handover by identifying candidate serving base stations for handover based on the interference information. For instance, one or more base stations with at least a predetermined margin to uplink loading can be recognized as candidate serving base stations. Further, the target serving base station can be chosen from the candidate serving base stations as a function of downlink energy per symbol. By way of illustration, a base station associated with a highest downlink energy per symbol from the candidate serving base stations can be selected as the target serving base station.

By way of a further example, random access channel (RACH) resources can be chosen as a function of the interference information corresponding to the base station and the at least one neighbor base station. Candidate RACH resources can be identified based on the interference information corresponding to the base station and the at least one neighbor base station. For instance, the candidate RACH resources can be recognized based on uplink loading; thus, subbands with at least a preset margin to loading can be identified as the candidate RACH resources. Moreover, a particular RACH resource from the candidate RACH resources can be selected for use for random access. The particular RACH resource, for example, can be chosen as a function of downlink energy per symbol.

In accordance with another example, a combination of transmit power adjustment, base station selection for handover, and/or random access can be controlled based on the interference information corresponding to the base station and the at least one neighbor base station. Moreover, it is contemplated that other operations can be managed as a function of the interference information.

Now turning to FIG. 7, illustrated is a methodology 700 that facilitates disseminating interference information in a wireless communication environment. At 702, uplink conditions can be monitored at a base station to generate interference information. For instance, the generated interference information can include interference-over-thermal (IoT) information, loading information, or the like. By way of example, the IoT information can include at least one IoT value for at least one subband. Moreover, the base station can be associated with predefined interference information (e.g., an IoT threshold, . . . ). At 704, disparate interference information can be collected from at least one neighbor base station. The disparate interference information can include monitored interference information and/or predefined interference information respectively corresponding to each of the at least one neighbor base station. Further, the generated interference information yielded by the base station and/or the predefined interference information associated with the base station can be distributed to the at least one neighbor base station. At 706, the generated interference information and the disparate interference information can be transmitted to one or more access terminals from the base station. The generated interference information and the disparate interference information can be sent via a broadcast channel such as a Dynamic Broadcast Channel (D-BCH), a control channel such as a Physical Downlink Control Channel (PDCCH), a loading information channel (LICH), a combination thereof, or the like.

It will be appreciated that, in accordance with one or more aspects described herein, inferences can be made regarding leveraging interference information in connection with controlling access terminal operation in a wireless communication environment. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 8:
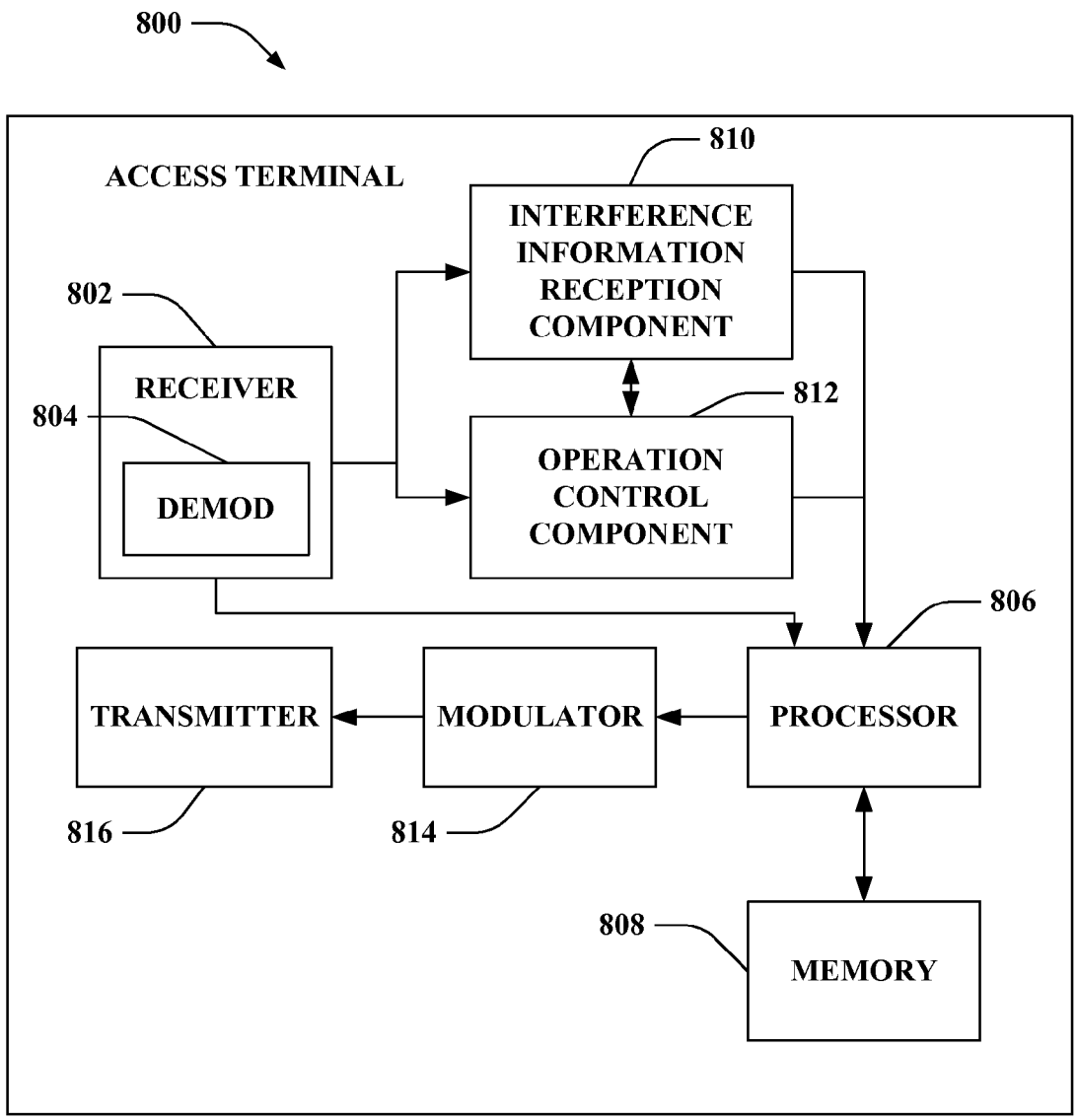
FIG. 8 is an illustration of an example access terminal that utilizes obtained interference information related to a plurality of base stations in a wireless communication system.

FIG. 8 is an illustration of an access terminal 800 that utilizes obtained interference information related to a plurality of base stations in a wireless communication system. Access terminal 800 comprises a receiver 802 that receives a signal from, for instance, a receive antenna (not shown), and performs typical actions thereon (e.g., filters, amplifies, downconverts, etc.) the received signal and digitizes the conditioned signal to obtain samples. Receiver 802 can be, for example, an MMSE receiver, and can comprise a demodulator 804 that can demodulate received symbols and provide them to a processor 806 for channel estimation. Processor 806 can be a processor dedicated to analyzing information received by receiver 802 and/or generating information for transmission by a transmitter 816, a processor that controls one or more components of access terminal 800, and/or a processor that both analyzes information received by receiver 802, generates information for transmission by transmitter 816, and controls one or more components of access terminal 800.

Access terminal 800 can additionally comprise memory 808 that is operatively coupled to processor 806 and that can store data to be transmitted, received data, and any other suitable information related to performing the various actions and functions set forth herein. Memory 808, for instance, can store protocols and/or algorithms associated with controlling operation of access terminal 800 as a function of received interference information.

It will be appreciated that the data store (e.g., memory 808) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 808 of the subject systems and methods is intended to comprise, without being limited to, these and any other suitable types of memory.

Processor 806 can be operatively coupled to an interference information reception component 810 and/or an operation control component 812. Interference information reception component 810 can be substantially similar to interference information reception component 214 of FIG. 2 and/or operation control component 812 can be substantially similar to operation control component 216 of FIG. 2. Interference information reception component 810 can obtain interference information related to a plurality of base stations from a particular one of the plurality of base stations. According to another example (not depicted), interference information reception component 810 can be part of receiver 802. Moreover, operation control component 812 can leverage the interference information to manage operation of access terminal 800. For instance, operation control component 812 can alter a transmit power utilized by access terminal 800, select a target base station for handover, choose random access channel (RACH) resource(s) to employ for random access, a combination thereof, or the like as a function of the interference information. Although not shown, it is to be appreciated that access terminal 800 can further include a power control component (e.g., substantially similar to power control component 302 of FIG. 3, . . . ), a handover management component (e.g., substantially similar to handover management component 402 of FIG. 4, . . . ), and/or a resource selection component (e.g., substantially similar to resource selection component 502 of FIG. 5, . . . ). Access terminal 800 still further comprises a modulator 814 and a transmitter 816 that transmits data, signals, etc. to a base station. Although depicted as being separate from the processor 806, it is to be appreciated that interference information reception component 810, operation control component 812 and/or modulator 814 can be part of processor 806 or a number of processors (not shown).

Figure 9:
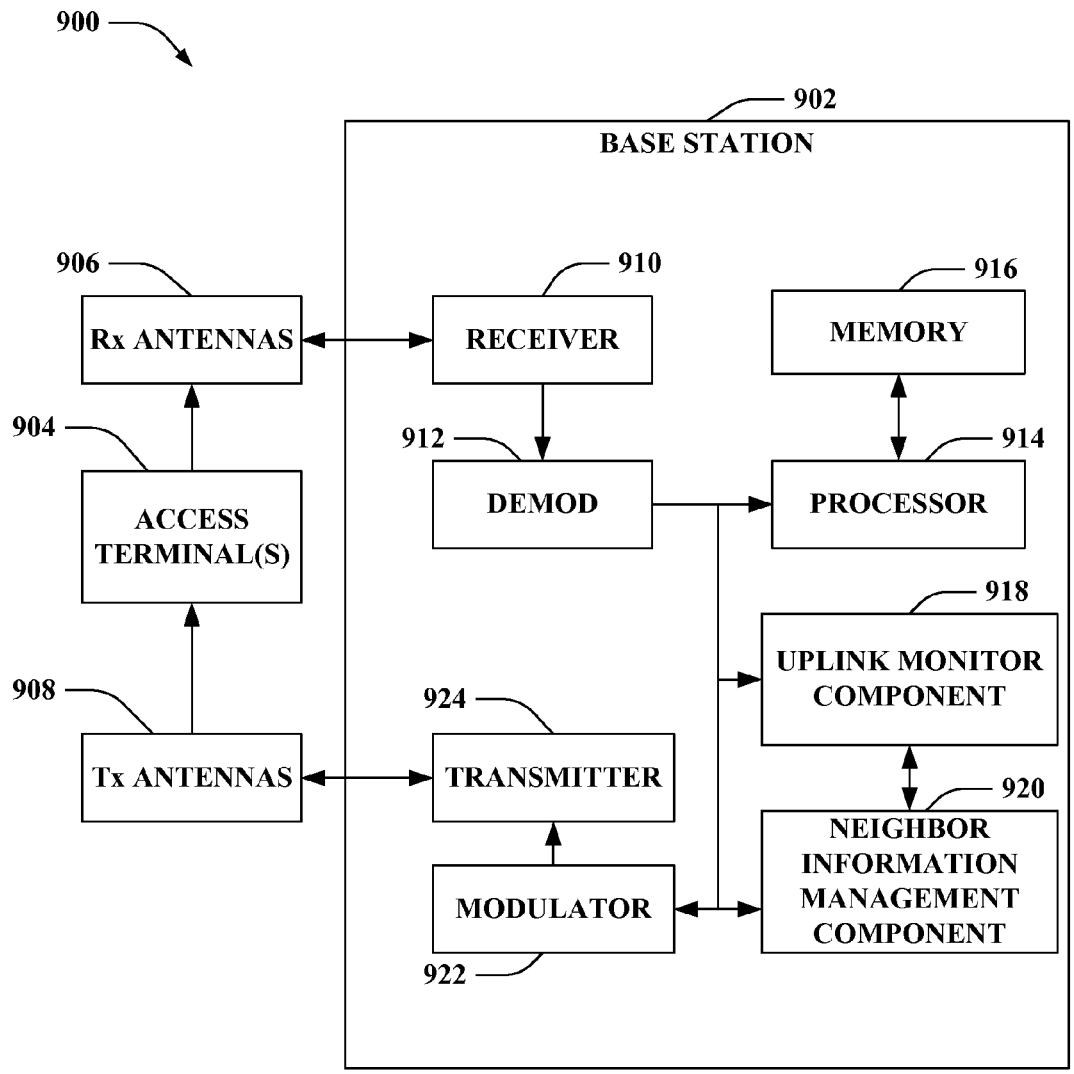
FIG. 9 is an illustration of an example system that distributes interference information in a wireless communication environment.

FIG. 9 is an illustration of a system 900 that distributes interference information in a wireless communication environment. System 900 comprises a base station 902 (e.g., access point, . . . ) with a receiver 910 that receives signal(s) from one or more access terminals 904 through a plurality of receive antennas 906, and a transmitter 924 that transmits to the one or more access terminals 904 through a transmit antenna 908. Receiver 910 can receive information from receive antennas 906 and is operatively associated with a demodulator 912 that demodulates received information. Demodulated symbols are analyzed by a processor 914 that can be similar to the processor described above with regard to FIG. 8, and which is coupled to a memory 916 that stores data to be transmitted to or received from access terminal(s) 904 and/or any other suitable information related to performing the various actions and functions set forth herein. Processor 914 is further coupled to an uplink monitor component 918 and/or a neighbor information management component 920. Uplink monitor component 918 can be substantially similar to uplink monitor component 208 of FIG. 2 and/or neighbor information management component 920 can be substantially similar to neighbor information management component 210 of FIG. 2. Uplink monitor component 918 can evaluate uplink conditions to yield interference information. Further, neighbor information management component 920 can assemble interference information from one or more neighbor base stations. The interference information yielded by uplink monitor component 918 and the interference information assembled from the one or more neighbor base stations by neighbor information management component 920 can thereafter be distributed to access terminal(s) 904. Moreover, although not shown, it is contemplated that base station 902 can further include an interference information transmission component, which can be substantially similar to interference information transmission component 212 of FIG. 2. Base station 902 can further include a modulator 922. Modulator 922 can multiplex a frame for transmission by a transmitter 924 through antennas 908 to access terminal(s) 904 in accordance with the aforementioned description. Although depicted as being separate from the processor 914, it is to be appreciated that uplink monitor component 918, neighbor information management component 920, and/or modulator 922 can be part of processor 914 or a number of processors (not shown).

Figure 10:
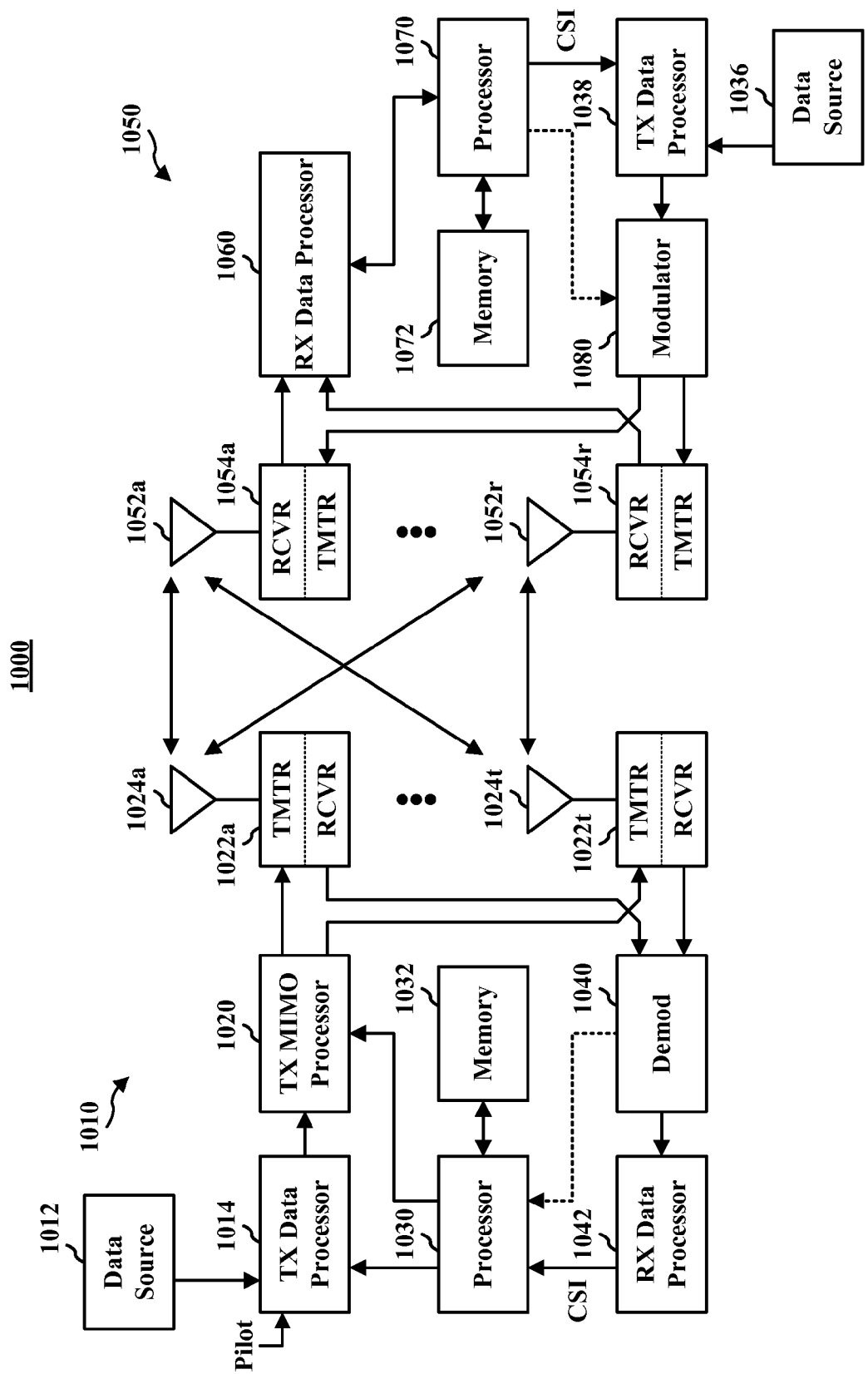
FIG. 10 is an illustration of an example wireless network environment that can be employed in conjunction with the various systems and methods described herein.

FIG. 10 shows an example wireless communication system 1000. The wireless communication system 1000 depicts one base station 1010 and one access terminal 1050 for sake of brevity. However, it is to be appreciated that system 1000 can include more than one base station and/or more than one access terminal, wherein additional base stations and/or access terminals can be substantially similar or different from example base station 1010 and access terminal 1050 described below. In addition, it is to be appreciated that base station 1010 and/or access terminal 1050 can employ the systems (FIGS. 1-5, 8-9, and 11-12) and/or methods (FIGS. 6-7) described herein to facilitate wireless communication there between.

At base station 1010, traffic data for a number of data streams is provided from a data source 1012 to a transmit (TX) data processor 1014. According to an example, each data stream can be transmitted over a respective antenna. TX data processor 1014 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 1050 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1030.

The modulation symbols for the data streams can be provided to a TX MIMO processor 1020, which can further process the modulation symbols (e.g., for OFDM). TX MIMO processor 1020 then provides $N_T$ modulation symbol streams to $N_T$ transmitters (TMTR) 1022a through 1022t. In various embodiments, TX MIMO processor 1020 applies beamforming weights to the symbols of the data streams and to the antenna from which the symbol is being transmitted.

Each transmitter 1022 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1022a through 1022t are transmitted from $N_T$ antennas 1024a through 1024t, respectively.

At access terminal 1050, the transmitted modulated signals are received by $N_R$ antennas 1052a through 1052r and the received signal from each antenna 1052 is provided to a respective receiver (RCVR) 1054a through 1054r. Each receiver 1054 conditions (e.g., filters, amplifies, and downconverts) a respective signal, digitizes the conditioned signal to provide samples, and further processes the samples to provide a corresponding "received" symbol stream.

An RX data processor 1060 can receive and process the $N_R$ received symbol streams from $N_R$ receivers 1054 based on a particular receiver processing technique to provide $N_T$ "detected" symbol streams. RX data processor 1060 can demodulate, deinterleave, and decode each detected symbol stream to recover the traffic data for the data stream. The processing by RX data processor 1060 is complementary to that performed by TX MIMO processor 1020 and TX data processor 1014 at base station 1010.

A processor 1070 can periodically determine which available technology to utilize as discussed above. Further, processor 1070 can formulate a reverse link message comprising a matrix index portion and a rank value portion.

The reverse link message can comprise various types of information regarding the communication link and/or the received data stream. The reverse link message can be processed by a TX data processor 1038, which also receives traffic data for a number of data streams from a data source 1036, modulated by a modulator 1080, conditioned by transmitters 1054a through 1054r, and transmitted back to base station 1010.

At base station 1010, the modulated signals from access terminal 1050 are received by antennas 1024, conditioned by receivers 1022, demodulated by a demodulator 1040, and processed by a RX data processor 1042 to extract the reverse link message transmitted by access terminal 1050. Further, processor 1030 can process the extracted message to determine which precoding matrix to use for determining the beamforming weights.

Processors 1030 and 1070 can direct (e.g., control, coordinate, manage, etc.) operation at base station 1010 and access terminal 1050, respectively. Respective processors 1030 and 1070 can be associated with memory 1032 and 1072 that store program codes and data. Processors 1030 and 1070 can also perform computations to derive frequency and impulse response estimates for the uplink and downlink, respectively.

In an aspect, logical channels are classified into Control Channels and Traffic Channels. Logical Control Channels can include a Broadcast Control Channel (BCCH), which is a DL channel for broadcasting system control information. Further, Logical Control Channels can include a Paging Control Channel (PCCH), which is a DL channel that transfers paging information. Moreover, the Logical Control Channels can comprise a Multicast Control Channel (MCCH), which is a Point-to-multipoint DL channel used for transmitting Multimedia Broadcast and Multicast Service (MBMS) scheduling and control information for one or several MTCHs. Generally, after establishing a Radio Resource Control (RRC) connection, this channel is only used by UEs that receive MBMS (e.g., old MCCH+MSCH). Additionally, the Logical Control Channels can include a Dedicated Control Channel (DCCH), which is a Point-to-point bi-directional channel that transmits dedicated control information and can be used by UEs having a RRC connection. In an aspect, the Logical Traffic Channels can comprise a Dedicated Traffic Channel (DTCH), which is a Point-to-point bi-directional channel dedicated to one UE for the transfer of user information. Also, the Logical Traffic Channels can include a Multicast Traffic Channel (MTCH) for Point-to-multipoint DL channel for transmitting traffic data.

In an aspect, Transport Channels are classified into DL and UL. DL Transport Channels comprise a Broadcast Channel (BCH), a Downlink Shared Data Channel (DL-SDCH) and a Paging Channel (PCH). The PCH can support UE power saving (e.g., Discontinuous Reception (DRX) cycle can be indicated by the network to the UE, . . . ) by being broadcasted over an entire cell and being mapped to Physical layer (PHY) resources that can be used for other control/traffic channels. The UL Transport Channels can comprise a Random Access Channel (RACH), a Request Channel (REQCH), a Uplink Shared Data Channel (UL-SDCH) and a plurality of PHY channels.

The PHY channels can include a set of DL channels and UL channels. For example, the DL PHY channels can include: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and/or Load Indicator Channel (LICH). By way of further illustration, the UL PHY Channels can include: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PS-DCH); and/or Broadband Pilot Channel (BPICH).

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 11:
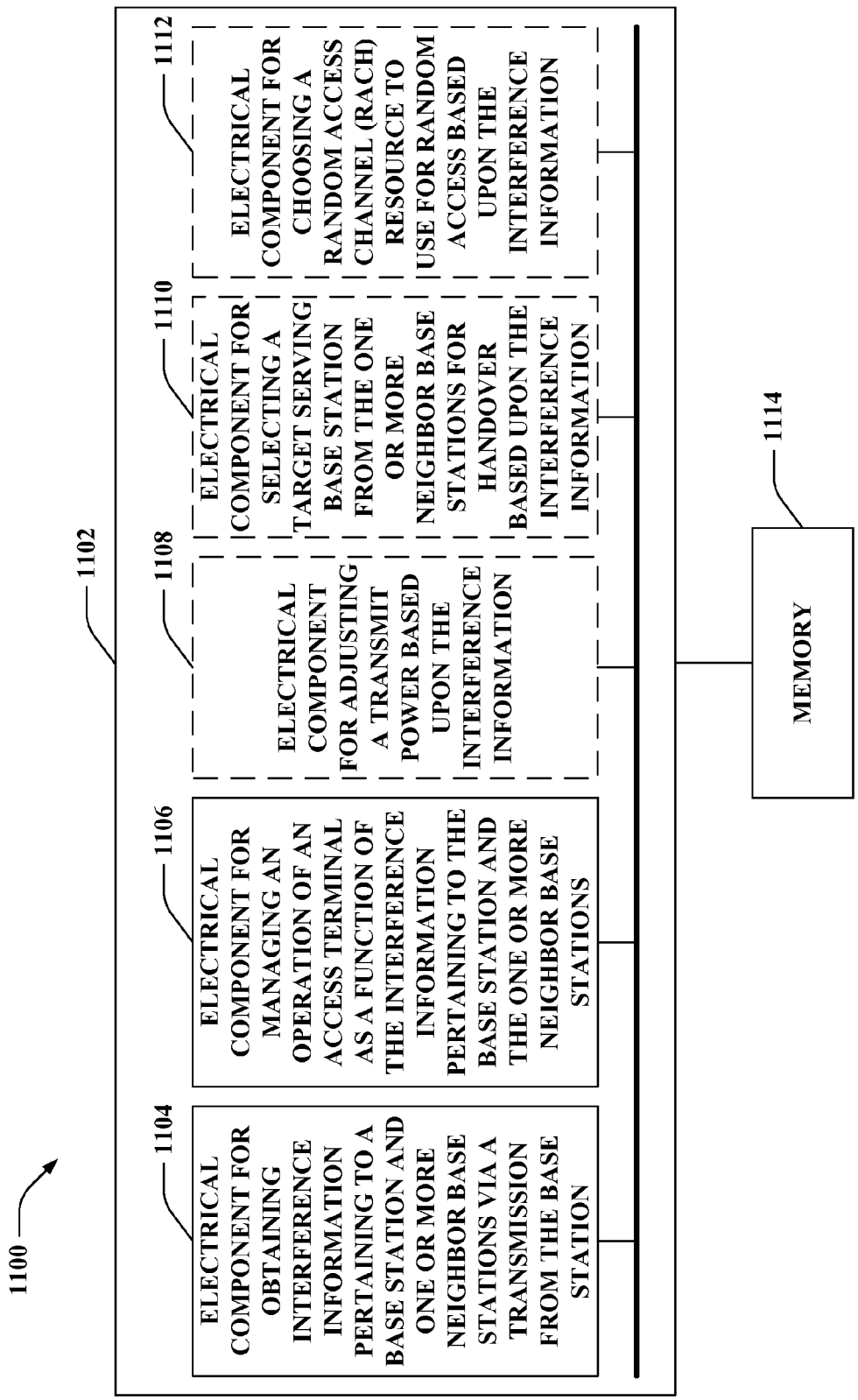
FIG. 11 is an illustration of an example system that enables utilizing interference information in a wireless communication environment.

With reference to FIG. 11, illustrated is a system 1100 that enables utilizing interference information in a wireless communication environment. For example, system 1100 can reside within an access terminal. It is to be appreciated that system 1100 is represented as including functional blocks, which can be functional blocks that represent functions implemented by a processor, software, or combination thereof (e.g., firmware). System 1100 includes a logical grouping 1102 of electrical components that can act in conjunction. For instance, logical grouping 1102 can include an electrical component for obtaining interference information pertaining to a base station and one or more neighbor base stations via a transmission from the base station 1104. Moreover, logical grouping 1102 can include an electrical component for managing operation of an access terminal as a function of the interference information pertaining to the base station and the one or more neighbor base stations 1106. Logical grouping 1102 can further optionally include an electrical component for adjusting a transmit power based upon the interference information 1108. Further, logical grouping 1102 can optionally include an electrical component for selecting a target serving base station from the one or more neighbor base stations for handover based upon the interference information 1110. Logical grouping 1102 can also optionally include an electrical component for choosing a random access channel (RACH) resource to use for random access based upon the interference information 1112. Additionally, system 1100 can include a memory 1114 that retains instructions for executing functions associated with electrical components 1104, 1106, 1108, 1110 and 1112. While shown as being external to memory 1114, it is to be understood that one or more of electrical components 1104, 1106, 1108, 1110, and 1112 can exist within memory 1114.

Figure 12:
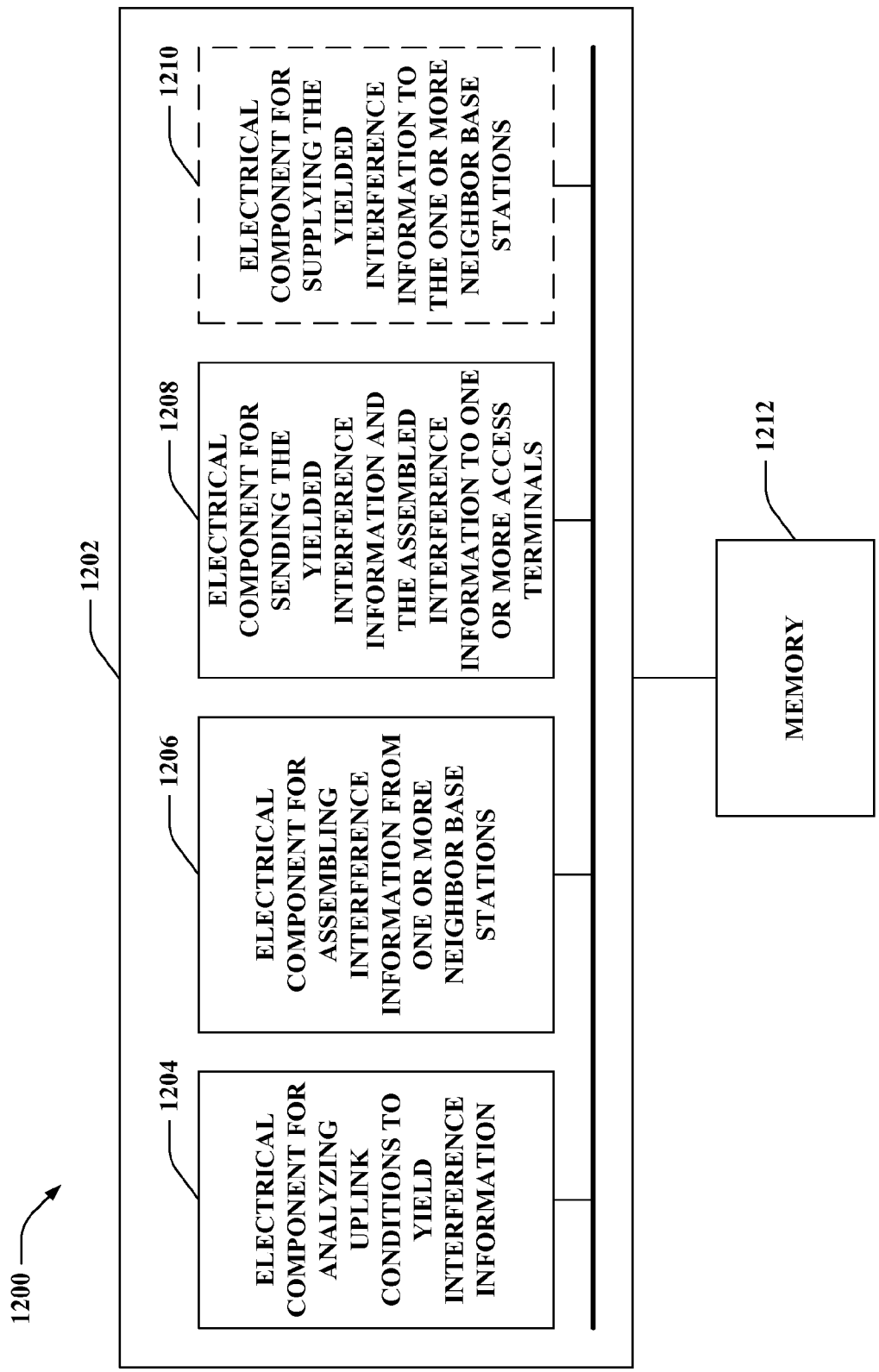
FIG. 12 is an illustration of an example system that enables distributing interference information in a wireless communication environment.

With reference to FIG. 12, illustrated is a system 1200 that enables distributing interference information in a wireless communication environment. For example, system 1200 can reside at least partially within a base station. It is to be appreciated that system 1200 is represented as including functional blocks, which can be functional blocks that represent functions implemented by a processor, software, or combination thereof (e.g., firmware). System 1200 includes a logical grouping 1202 of electrical components that can act in conjunction. For instance, logical grouping 1202 can include an electrical component for analyzing uplink conditions to yield interference information 1204. Further, logical grouping 1202 can include an electrical component for assembling interference information from one or more neighbor base stations 1206. Moreover, logical grouping 1202 can include an electrical component for sending the yielded interference information and the assembled interference information to one or more access terminals 1208. Logical grouping 1202 can also optionally include an electrical component for supplying yielded interference information to the one or more neighbor base stations 1210. Additionally, system 1200 can include a memory 1212 that retains instructions for executing functions associated with electrical components 1204, 1206, 1208, and 1210. While shown as being external to memory 1212, it is to be understood that one or more of electrical components 1204, 1206, 1208, and 1210 can exist within memory 1212.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates managing operation of an access terminal in a wireless communication environment, comprising:

receiving, at the access terminal, interference information corresponding to a base station and at least one neighbor base station via a transmission from the base station; and controlling an operation of the access terminal based on the interference information corresponding to the base station and the at least one neighbor base station, wherein controlling the operation further comprises:

adjusting a transmit power of the access terminal based on the interference information corresponding to the base station and the at least one neighbor base station, and adjusting the transmit power of the access terminal as a function of channel gain to the base station and weighted channel gains to the at least one neighbor base station having downlink energy per symbol above a threshold.

2. The method of claim 1, further comprising adjusting the transmit power of the access terminal as a function of weighted interference information from the base station and the at least one neighbor base station having energy per symbol above the threshold.

3. A method that facilitates managing operation of an access terminal in a wireless communication environment, comprising:
receiving, at the access terminal, interference information corresponding to a base station and at least one neighbor base station via a transmission from the base station; and
controlling an operation of the access terminal based on the interference information corresponding to the base station and the at least one neighbor base station, wherein controlling the operation further comprises selecting a target serving base station for handover from the at least one neighbor base station as a function of the interference information corresponding to the base station and the at least one neighbor base station.

4. The method of claim 3, further comprising:
identifying candidate serving base stations for handover based on the interference information; and
choosing the target serving base station from the candidate serving base stations as a function of downlink energy per symbol.

5. The method of claim 4, further comprising recognizing one or more base station with at least a predetermined margin to uplink loading as the candidate serving base stations.

6. The method of claim 4, further comprising selecting a particular base station with a highest downlink energy per symbol from the candidate serving base stations as the target serving base station.

7. A method that facilitates managing operation of an access terminal in a wireless communication environment, comprising:
receiving, at the terminal, interference information corresponding to a base station and at least one neighbor base station via a transmission from the base station; and
controlling an operation of the access terminal based on the interference information corresponding to the base station and the at least one neighbor base station, wherein controlling the operation further comprises choosing random access channel (RACH) resources as a function of the interference information corresponding to the base station and the at least one neighbor base station.

8. The method of claim 7, further comprising:
identifying candidate RACH resources based on the interference information corresponding to the base station and the at least one neighbor base station; and
selecting a particular RACH resource from the candidate RACH resources for use for random access as a function of downlink energy per symbol.

9. A wireless communications apparatus, comprising:
a memory that retains instructions to:
obtain interference information corresponding to a base station and at least one neighbor base station via a transmission from the base station, and
control an operation of an access terminal based on the interference information corresponding to the base station and the at least one neighbor base station, wherein the memory further retains instructions to:
adjust a transmit power of the access terminal based on the interference information corresponding to the base station and the at least one neighbor base station, and
adjust the transmit power of the access terminal as a function of channel gain to the base station, weighted channel gains to one or more of the at least one neighbor base station, and weighted interference information; and
a processor, coupled to the memory, configured to execute the instructions retained in the memory.

10. A wireless communications apparatus, comprising:
a memory that retains instructions to:
obtain interference information corresponding to a base station and at least one neighbor base station via a transmission from the base station, and
control an operation of an access terminal based on the interference information corresponding to the base station and the at least one neighbor base station, wherein the memory further retains instructions to select a target serving base station for handover from the at least one neighbor base station as a function of the interference information corresponding to the base station and the at least one neighbor base station; and
a processor, coupled to the memory, configured to execute the instructions retained in the memory.

11. The wireless communications apparatus of claim 10, wherein the memory further retains instructions to:
identify candidate serving base stations for handover based on the interference information, and
choose the target serving base station from the candidate serving base stations as a function of downlink energy per symbol.

12. A wireless communications apparatus, comprising:
a memory that retains instructions to:
obtain interference information corresponding to a base station and at least one neighbor base station via a transmission from the base station, and
control an operation of an access terminal based on the interference information corresponding to the base station and the at least one neighbor base station, wherein the memory further retains instructions to choose random access channel (RACH) resources as a function of the interference information corresponding to the base station and the at least one neighbor base station; and
a processor, coupled to the memory, configured to execute the instructions retained in the memory.

13. The wireless communications apparatus of claim 12, wherein the memory further retains instructions to:
identify candidate RACH resources based on the interference information corresponding to the base station and the at least one neighbor base station, and
select a particular RACH resource from the candidate RACH resources for use for random access as a function of downlink energy per symbol.

14. A wireless communications apparatus that enables utilizing interference information in a wireless communication environment, comprising:
means for obtaining interference information pertaining to a base station and one or more neighbor base stations via a transmission from the base station;
means for managing an operation of an access terminal as a function of the interference information pertaining to the base station and the one or more neighbor base stations; and
means for selecting a target serving base station from the one or more neighbor base stations for handover based upon the interference information.

15. A wireless communications apparatus that enables utilizing interference information in a wireless communication environment, comprising:

means for obtaining interference information pertaining to a base station and one or more neighbor base stations via a transmission from the base station;

means for managing an operation of an access terminal as a function of the interference information pertaining to the base station and the one or more neighbor base stations; and means for choosing a random access channel (RACH) resource to use for random access based upon the interference information.

16. A computer program product, comprising:
a non-transitory computer-readable medium comprising:
code for obtaining interference information pertaining to a base station and one or more neighbor base stations via a transmission from the base station; and
code for controlling at least one of:
alteration of a transmit power of an access terminal as a function of channel gain to the base station and weighted channel gains to the one or more neighbor base stations having downlink energy per symbol above a threshold,
selection of a target serving base station for handover as a function of the interference information pertaining to the base station and the one or more neighbor base stations, or
selection of a random access channel (RACH) resource to use for random access as a function of the interference information pertaining to the base station and the one or more neighbor base stations.

17. The computer program product of claim 16, wherein the interference information comprises at least one interference-over-thermal (IoT) value for at least one subband and an IoT threshold for each of the base station and the one or more neighbor base stations.

18. The computer program product of claim 16, wherein the non-transitory computer-readable medium further comprises code for obtaining the interference information via at least one of a broadcast channel, a control channel, or a loading information channel.

19. A wireless communications apparatus, comprising:
a processor configured to:
receive interference information pertaining to a base station and one or more neighbor base stations via a transmission from the base station; and
manage at least one of:
adjustment of a transmit power of an access terminal as a function of channel gain to the base station and weighted channel gains to the one or more neighbor base stations having downlink energy per symbol above a threshold,
selection of a target serving base station for handover as a function of the interference information pertaining to the base station and the one or more neighbor base stations, or
selection of a random access channel (RACH) resource to use for random access as a function of the interference information pertaining to the base station and the one or more neighbor base stations.

20. A wireless communications apparatus that enables utilizing interference information in a wireless communication environment, comprising:
means for obtaining interference information corresponding to a base station and one or more neighbor base stations via a transmission from the base station; and
means for managing an operation of an access terminal as a function of the interference information pertaining to the base station and the one or more neighbor base stations;
means for adjusting a transmit power of the access terminal based on the interference information corresponding to the base station and the one or more neighbor base stations; and
means for adjusting the transmit power of the access terminal as a function of channel gain to the base station and weighted channel gains to the at least one neighbor base station having downlink energy per symbol above a threshold.

* * * * *